(No Model.) 2 Sheets—Sheet 2.
C. H. STRATTON.
TRACTION ENGINE.
No. 492,637. Patented Feb. 28, 1893.
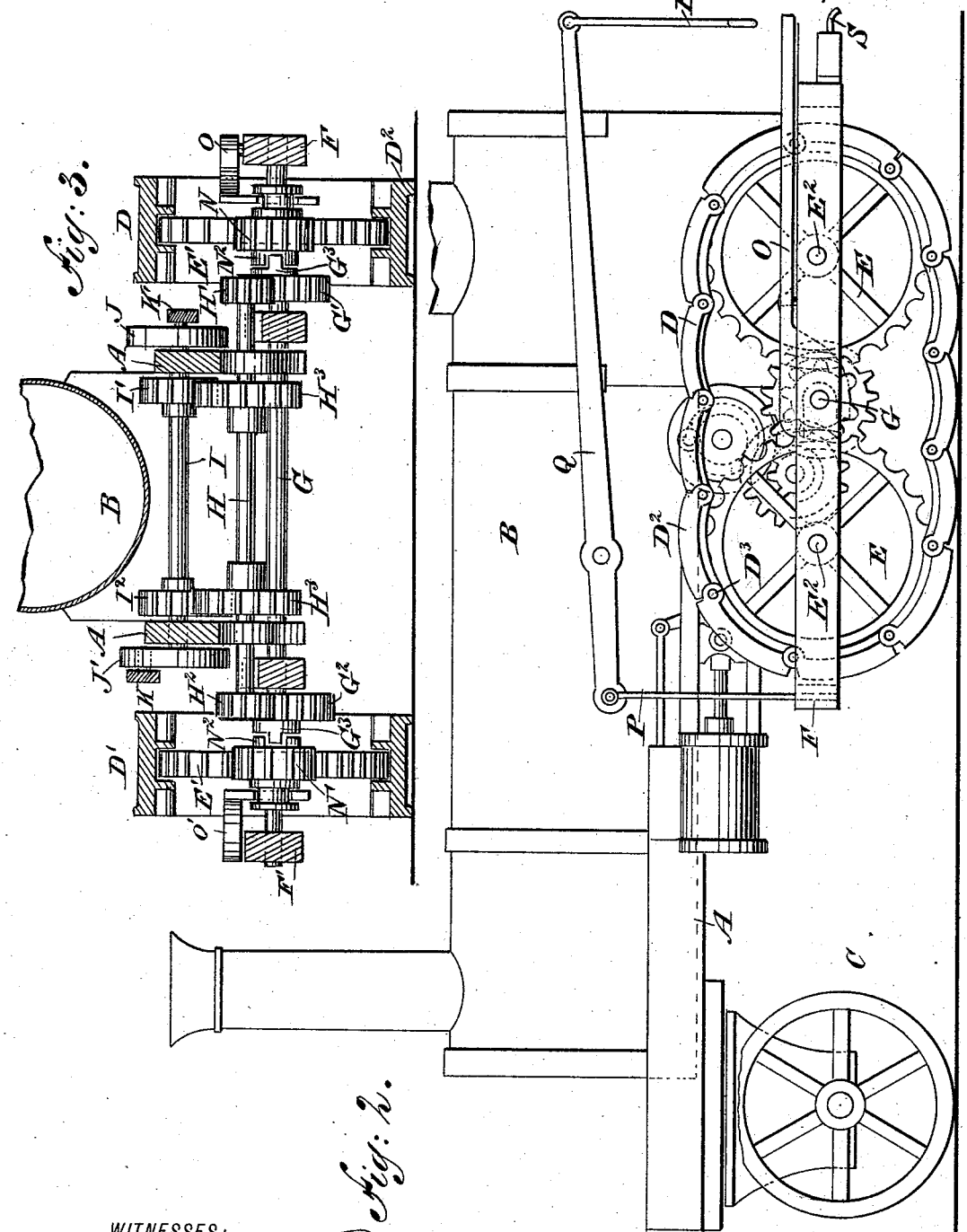
WITNESSES:
Chas. Nider.
C. Sedgwick
INVENTOR
C. H. Stratton
BY Munn & Co.
ATTORNEYS.

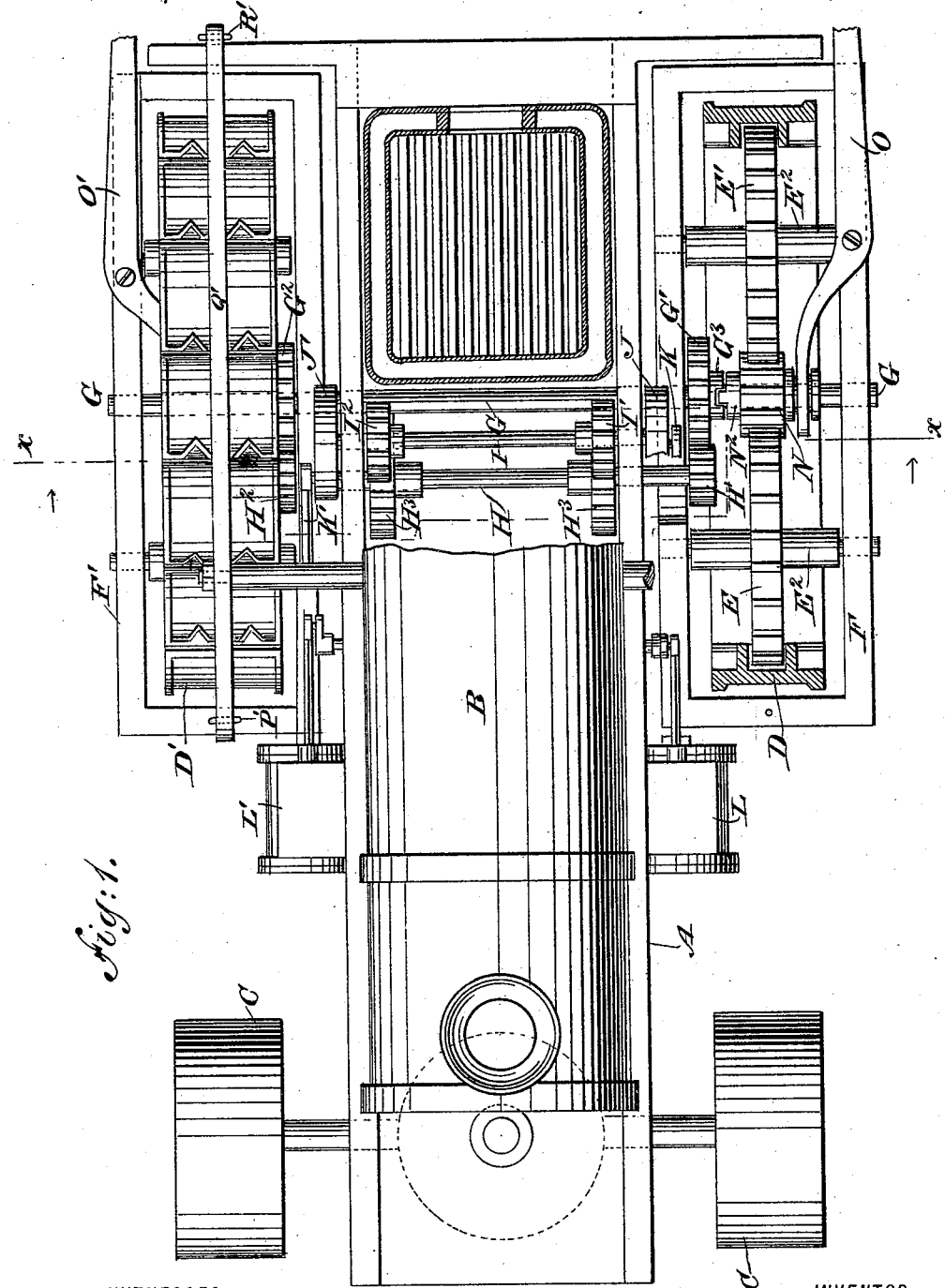

UNITED STATES PATENT OFFICE.

CHARLES H. STRATTON, OF BRANDT, PENNSYLVANIA.

TRACTION-ENGINE.

SPECIFICATION forming part of Letters Patent No. 492,637, dated February 28, 1893.

Application filed July 25, 1892. Serial No. 441,169. (No model.)

*To all whom it may concern:*

Be it known that I, CHARLES H. STRATTON, of Brandt, in the county of Susquehanna and State of Pennsylvania, have invented a new and Improved Traction-Engine, of which the following is a full, clear, and exact description.

The object of the invention is to provide a new and improved traction engine, which is simple and durable in construction, very effective in operation and more especially designed for use on farm land, to readily travel over plowed ground, for cross plowing, and other work.

The invention consists of endless tracks adapted to travel on the ground and engaged by wheels actuated from the engine, the said wheels imparting a traveling motion to the said tracks, thereby propelling the machine.

The invention also consists of certain parts and details, and combinations of the same, as will be described hereinafter and then pointed out in the claims.

Reference is to be had to the accompanying drawings, forming a part of this specification, in which similar letters of reference indicate corresponding parts in all the figures.

Figure 1 is a plan view of the improvement with parts in section. Fig. 2 is a side elevation of the same; and Fig. 3 is a transverse section of the same on the line $x$—$x$ of Fig. 1.

The improved traction engine is provided with a suitably constructed frame A, on which is mounted the usual boiler B, and which is supported at its front end by wheels C, the axle of which is pivotally connected in its middle with the middle of the front end of the said frame A. The rear part of the frame A is supported by two tracks D and D', made in the shape of endless chains and arranged longitudinally on each side of the frame.

Each of the tracks D and D' is composed of a series of links $D^2$ pivotally connected with each other as at $D^3$, the said joints being adapted to be engaged by teeth formed in sets of gear wheels E and E' having their shafts $E^2$ journaled in frames F and F' respectively, both pivoted at the ends of a shaft G mounted to turn in suitable bearings in the main frame A, as is plainly illustrated in the drawings. The inside of each link $D^2$ of the tracks D and D' is segmental, so as to conform to the shape of the gear wheels E and E', the outer surfaces of the said links being formed with corrugations or ridges which readily embed themselves in the ground, so as to prevent slipping when the machine is propelled forward.

The shaft G carries, inside of the frames F and F', the gear wheels G' and $G^2$ respectively, meshing into the pinions H' and $H^2$ respectively, secured on a shaft H extending transversely and mounted to turn in suitable bearings in the main frame A. On this shaft H, within the frame A, are secured the gear wheels $H^3$ in mesh with the pinions I', $I^2$, secured on a shaft I, mounted to turn in suitable bearings in the main frame A and carrying, at its outer ends the crank disks J and J' respectively, pivotally connected by the pitmen K and K' with the cylinders L and L' respectively, held on the main frame A, and of any approved construction. The crank disks J and J' are preferably arranged with their wrist pins at angles, so as to avoid dead center positions. When the cylinders L and L' are supplied with steam generated in the boiler B, then the crank disks J and J' impart a rotary motion to the shaft I, which, by the pinions I' $I^2$, meshing into the gear wheels $H^3$, rotates the shaft H, which latter, by the pinions H' and $H^2$ meshing into the gear wheels G' and $G^2$, rotates the shaft G.

The gear wheels G' and $G^2$ are provided on their outer faces with clutch teeth $G^3$, adapted to be engaged by similar clutch teeth $N^2$ held on the pinions N and N' in mesh with the two gear wheels E and E' for the respective tracks D and D'. Thus, when the shaft G is rotated, as previously described, and the clutch teeth $N^2$ and $G^3$ are in mesh, then a rotary motion is imparted to the pinions N and N', so that the sets of gear wheels E and E' are revolved and a traveling motion is imparted to the tracks D and D', so that the machine is propelled backward or forward, according to the direction in which the shaft G rotates.

Either of the gear wheels N and N' can be thrown into or out of mesh, by its clutch teeth $N^2$ with the respective clutch teeth of the gear wheel G' and $G^2$, and for this purpose said gear wheels N and N' are connected at their hubs with shifting levers O and O' respectively, pivoted on the frame F, as is plainly shown in the drawings. The front ends of the frames F and F' are pivotally connected by links P and P' with levers Q and Q' respectively, pivoted on the boiler B and extending rearward, as shown. The rear ends of the levers Q and Q' carry rods R and R' adapted to be hooked at their lower ends on the lugs or projections S secured to the main frame A. When the rods are disconnected, as illustrated in Fig. 2, the frames F and F' are in their normal position, that is, they extend horizontally, but when it is desired to raise the front end of either or both of the frames F and F', then their respective rods R and R' are pulled downward and thrown into engagement with the lugs or projections S, to lock the levers in place. This movement raises the front end of the frame F or F' to facilitate turning the machine whenever desired. As either of the pinions N and N' can be thrown out of mesh with its respective gear wheel G or G', either of the two tracks D or D' can be set in motion, while the other remains at a stand still, so as to facilitate turning in a very short space, it being understood that the pivoted front wheels readily swing into a normal position when the said turning takes place. It will be seen that when the machine travels forward over the ground, by means of the tracks D and D' being actuated as described, the latter readily adjust themselves to any inequalities in the ground, as the frames F and F' carrying the wheels E and E' for the said tracks can readily swing up or down, on account of being fulcrumed or pivoted on the shaft G.

It is understood that the pinions N and N' previously mentioned are mounted to rotate loosely on the shaft G, so that when the frames F and F' swing up or down at their front or rear ends, the said pinions N and N' still remain in mesh with their respective sets of gear wheels E and E'.

Having thus described my invention, what I claim as new, and desire to secure by Letters Patent, is—

1. In a traction engine, the combination, with a main frame supporting the boiler and motive power, of separate and independent endless tracks arranged at the sides of the said main frame and adapted to travel on the ground, and a pair of round wheels for each track adapted to be driven from the motive power on the said main frame, the said wheels engaging the said endless tracks to impart a traveling motion to the latter, so as to propel the machine, substantially as shown and described.

2. In a traction engine, the combination, with a main frame carrying the boiler and motive power, of a shaft journaled in the said main frame and adapted to be rotated by the motive power on the main frame, auxiliary frames loosely pivoted on the said shaft, gear wheels journaled in the said auxiliary frames and adapted to be driven from the said shaft, and endless tracks passing over the said gear wheels and adapted to receive a traveling motion from the latter, substantially as shown and described.

3. In a traction engine, the combination, with a main frame supporting the boiler and motive power, of a shaft journaled in the said main frame and adapted to be rotated from the said motive power, auxiliary frames fulcrumed on the said shaft on either side of the main frame, gear wheels journaled in the said main frame, endless tracks adapted to travel on the ground and engaged by the said gear wheels, and pinions mounted to rotate loosely on the said shaft and in mesh with the said track gear wheels, the said pinions being adapted to be thrown into and out of gear with suitable mechanism on the said shaft, substantially as shown and described.

4. In a traction engine, the combination, with a main frame supporting the motive power, of two auxiliary frames journaled on the sides of the said main frame, endless tracks mounted to travel in the said auxiliary frames and adapted to receive a traveling motion from the motive power on the main frame, and means, substantially as described, for raising or lowering the front ends of the said auxiliary frames, substantially as shown and described.

5. In a traction engine, the combination, with a main frame supporting the motive power, of two auxiliary frames journaled on the sides of the said main frame, endless tracks mounted to travel in the said auxiliary frames and adapted to receive a traveling motion from the motive power on the main frame, means substantially as described, for raising or lowering the front ends of the said auxiliary frames, and steering or guide wheels mounted on an axle pivotally connected with the front end of the said main frame, substantially as shown and described.

6. In a traction engine, the combination, with a main frame supporting the motive power, of two auxiliary frames journaled on the sides of the said main frame, endless tracks mounted to travel in the said auxiliary frames and adapted to receive a traveling motion from the motive power on the main frame, means, substantially as described, for raising or lowering the front ends of the said auxiliary frames, steering or guide wheels mounted on an axle pivotally connected with the front end of the said main frame, and means, substantially as described, for connecting the said endless tracks with the motive power or disconnecting them from the same, substantially as shown and described.

CHARLES H. STRATTON.

Witnesses:
THOMAS FRICK,
GEORGE J. BROWN.